(12) United States Patent
Kwon et al.

(10) Patent No.: US 8,889,234 B2
(45) Date of Patent: Nov. 18, 2014

(54) METHOD OF GENERATING STRUCTURAL COLOR

(75) Inventors: Sunghoon Kwon, Seoul (KR); Hyoki Kim, Seoul (KR)

(73) Assignee: SNU R&DB Foundation, Seoul (KR)

( * ) Notice: Subject to any disclaimer, the term of this patent is extended or adjusted under 35 U.S.C. 154(b) by 432 days.

(21) Appl. No.: 13/271,674

(22) Filed: Oct. 12, 2011

(65) Prior Publication Data

US 2012/0064309 A1  Mar. 15, 2012

Related U.S. Application Data

(60) Provisional application No. 61/169,260, filed on Apr. 14, 2009.

(51) Int. Cl.
*G02B 1/08* (2006.01)
*B01J 19/12* (2006.01)
(Continued)

(52) U.S. Cl.
CPC .................. *B01J 19/12* (2013.01); *B82Y 20/00* (2013.01); *B82Y 25/00* (2013.01); *C09C 1/24* (2013.01); *C09D 7/1225* (2013.01); *C09D 7/1283* (2013.01); *C09D 11/50* (2013.01); *G02B 1/005* (2013.01); *G02B 5/201* (2013.01); *H01F 1/0063* (2013.01); *G02F 1/09* (2013.01); *G02F 1/29* (2013.01); *C01P 2006/42* (2013.01); *C08K 3/22* (2013.01); *C08K 9/08* (2013.01); *G02B 2207/101* (2013.01); *H01F 1/344* (2013.01)
USPC .......................................... 427/547; 427/550

(58) Field of Classification Search
CPC ............... G02B 1/08; G02F 1/29; G02F 1/01; G02F 1/25
USPC ............. 427/502, 589, 162, 163.1, 457, 547, 427/550; 349/78, 97; 252/62.65; 977/811
See application file for complete search history.

(56) References Cited

U.S. PATENT DOCUMENTS

2005/0088079 A1* 4/2005 Daniels ......................... 313/504

FOREIGN PATENT DOCUMENTS

KR  10-2004-0081103 A  9/2004
KR  10-2004-0086256 A  10/2004
(Continued)

OTHER PUBLICATIONS

Gira Yi, Photonic Crystals for Controlling the Light, NICE, 2005, pp. 446-455, vol. 23, No. 4.

(Continued)

*Primary Examiner* — Michael Cleveland
*Assistant Examiner* — Tabassom Tadayyon Eslami
(74) *Attorney, Agent, or Firm* — Sherr & Jiang, PLLC

(57) ABSTRACT

Provided is a method of printing a structural color. The method includes providing a first substrate, forming a layer of a composition for generating a structural color including magnetic nanoparticles and a curable material on the first substrate, applying a magnetic field to the layer of the composition for generating a structural color and exhibiting a structural color using a change in lattice spacing of a photonic crystal composed of magnetic nanoparticles depending on the magnetic field strength, and curing the layer of the composition for generating a structural color to fix the lattice spacing of the photonic crystal and to form a structural color printed layer.

20 Claims, 13 Drawing Sheets

(51) Int. Cl.

| | | |
|---|---|---|
| *B82Y 20/00* | (2011.01) | |
| *B82Y 25/00* | (2011.01) | |
| *C09C 1/24* | (2006.01) | |
| *C09D 7/12* | (2006.01) | |
| *C09D 11/50* | (2014.01) | |
| *G02B 1/00* | (2006.01) | |
| *G02B 5/20* | (2006.01) | |
| *H01F 1/00* | (2006.01) | |
| *G02F 1/09* | (2006.01) | |
| *G02F 1/29* | (2006.01) | |
| *C08K 3/22* | (2006.01) | |
| *C08K 9/08* | (2006.01) | |
| *H01F 1/34* | (2006.01) | |

(56) References Cited

FOREIGN PATENT DOCUMENTS

| WO | WO 2009/017525 | | 2/2009 |
|---|---|---|---|
| WO | WO2009/017525 | * | 2/2009 |

OTHER PUBLICATIONS

Korean Intellectual Property Office, International Search Report for International Application No. PCT/KR2010/002303, Jan. 12, 2011.

Jianping GE et al., "Magnetically Tunable Colloidal Photonic Structures in Alkanol Solutions", Advanced Materials, 2008, pp. 3485-3491, vol. 20.

Jianping GE et al., "Highly Tunable Superparamagnetic Colloidal Photonic Crystals", Angewandte Chemic International Edition, 2007, pp. 7428-7431, vol. 46.

Jianping GE et al., "Superparamagnetic Composite Colloids with Anisotropic Structures", Journal of the American Chemical Society, 2007, pp. 8974-8975, vol. 129.

Xiangling Xu et al., "Mesoscopic Monodisperse Ferromagnetic Colloids Enable Magnetically . . . ", Journal of the American Chemical Society, 2002, pp. 13864-13868. vol. 124.

Jun Hyuk Moon et al., "Colloidal Engineering for Nano-Bio Fusion Research", Korean Chem. Eng. Res., Aug. 2008, pp. 647-659, vol. 46, No. 4.

Chih-Kai Huang et al., "Magnetic $SiO_2/Fe_3O_4$ colloidal crystals", Nanotechnology 19, 2008. 055701 (5pp), IOP Publishing Ltd.

Xiangling Xu et al., "Superparamagnetic Photonic Crystals", Advanced Materials, Nov. 16, 2001, pp. 1681-1684, vol. 13, No. 22.

Vinayak Rastogi et al., "Synthesis of Light-Diffracting Assemblies from Microspheres Nanoparticles in Droplets on . . . ", Advanced Materials, 2008, pp. 4263-4268, vol. 20.

Orlin D. Velev et al., "A Class of Microstructured Particles Through Colloidal Crystallization", Science, Mar. 24, 2000, pp. 2240-2243, vol. 287.

Byron Gates et al., "Photonic Crystals That Can Be Addressed with an External Magnetic Field", Advanced Materials, Nov. 2, 2001, pp. 1605-1608, vol. 13, No. 21.

Benjamin T. A, Chang et al., "CARIVERSE Resin: A Thermally Reversible Network Polymer for Electronic . . . ", Electronic Components and Technology Conference, 1999, pp. 49-55.

* cited by examiner

UV

METHOD OF GENERATING STRUCTURAL COLOR

CROSS REFERENCE TO PRIOR APPLICATIONS

This application claims the benefit under 35 U.S.C. §120 and §365(c) to a prior PCT International Patent Application No. PCT/KR2010/002303 (filed on Apr. 14, 2010 and designating the U.S.), which claims priority to U.S. Provisional Application No. 61/169,260 (filed on Apr. 14, 2009), which are all hereby incorporated by reference in their entirety.

TECHNICAL FIELD

The described technology relates generally to a method of generating a structural color.

BACKGROUND

Structural colors in nature, such as those on butterfly wings, beetle cuticles and peacock feathers, have attracted considerable attention in a variety of research areas. Structural color has many characteristics that differ from those of chemical pigments or dyes. For example, in the feathers of a peacock, various colors result from the interaction of light with a single biological material: melanin rods. The iridescent colors are formed as a result of the lattice spacing of the rods. In nature, a single biological material with different physical configurations displays various colors, which greatly simplifies the manufacturing process in producing multiple colors. The unique colors originating from the physical structures are iridescent and metallic, and cannot be mimicked by chemical dyes or pigments. Furthermore, structural color is free from photobleaching, unlike traditional pigments or dyes.

Owing to its unique characteristics, there have been many attempts to make artificial structural color through various technological approaches such as colloidal crystallization, dielectric layer stacking and direct lithographic patterning. The colloidal crystallization technique is most frequently used to make a photonic crystal, which blocks a specific wavelength of light in the crystal and therefore displays the corresponding color. Gravitational force, centrifugal force, hydrodynamic flow, electrophoretic deposition and capillary force from the evaporation of solvents are used to assemble the colloidal crystals. Although these methods produce structural colors with a large area, the growth of colloidal crystals usually takes a long time so as to achieve better crystallization and fewer defects. Also, because the bandgap of a photonic crystal is dependent on the size of the colloids used, different sizes of colloidal suspensions are needed to produce multicolored structures. Furthermore, there have been great technological difficulties in assembling colloids of different sizes to form these multicolored patterns with fine resolutions. Dielectric layer stacking and lithographic patterning of periodic dielectric materials generates structural color by directly controlling the submicrometer structure of the surface. Various fabrication processes have been reported, including replicating natural substrates, depositing materials layer by layer and etching a substrate using various lithographic techniques. These approaches are advantageous in that they accurately fabricate a periodic dielectric structure on the surface, which controls the desired photonic bandgap. However, in spite of the advantage of sculpting sophisticated nanostructures in a well controlled manner, a cost-effective manufacturing scheme to generate multicolored structures over a large area is hard to achieve owing to the requirement for a vacuum process. Moreover, great effort and long process times are necessary to produce multicolored patterns on a substrate, because different pitches of dielectric stacks are required to achieve different colors.

SUMMARY

In one embodiment, a method of printing a structural color is provided. The method includes: providing a first substrate, forming a layer of a composition for generating a structural color including magnetic nanoparticles and a curable material on the first substrate, applying a magnetic field to the layer of the composition for generating a structural color and exhibiting a structural color through a change in lattice spacing of a photonic crystal composed of magnetic nanoparticles depending on the magnetic field strength, and curing the layer of the composition for generating a structural color to fix the lattice spacing of the photonic crystal and to form a structural color printed layer.

In another embodiment, a composition for generating a structural color including a curable material and magnetic nanoparticles dispersed in the curable material is provided.

In still another embodiment, a structural color printed product including a solid medium and magnetic nanoparticles dispersed in the solid medium is provided. Here, the magnetic nanoparticles are spaced at regular intervals to form chain structures in an orientation of at least one axis, and a wavelength of light diffracted from external incident light is determined by a size of the interval.

In yet another embodiment, a method of generating a structural color is provided. The method includes fixing an aligned structure of magnetic nanoparticles in a medium to diffract light due to the aligned structure and to generate the structural color.

In yet another embodiment, a method of generating a structural color is provided. The method includes tuning an aligned structure by aligning magnetic nanoparticles containing a superparamagnetic material in a photocurable material, and fixing the aligned structure by curing the photocurable material. Here, the tuning and the fixing are repeated to perform multi-color patterning.

The Summary is provided to introduce a selection of concepts in a simplified form that are further described below in the Detailed Description. The Summary is not intended to identify key features or essential features of the claimed subject matter, nor is it intended to be used as an aid in determining the scope of the claimed subject matter.

BRIEF DESCRIPTION OF THE DRAWINGS

The above and other features and advantages of the present disclosure will become more apparent to those of ordinary skill in the art by describing in detail example embodiments thereof with reference to the attached drawings in which.

DETAILED DESCRIPTION

Figure 1:
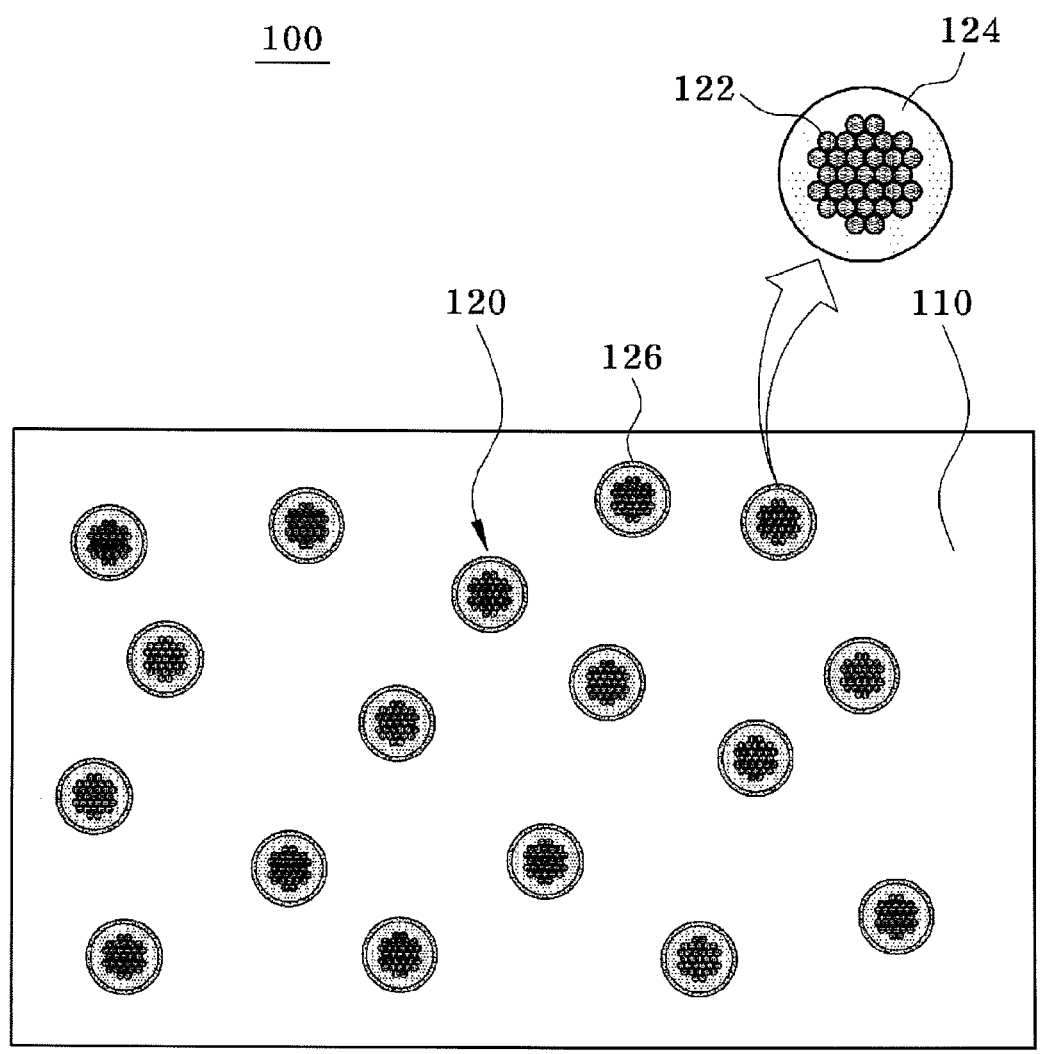
FIG. 1 is a diagram of a composition for generating a structural color according to an exemplary embodiment.

It will be readily understood that the components of the present disclosure, as generally described and illustrated in the figures herein, could be arranged and designed in a wide variety of different configurations. Thus, the following more detailed description of the embodiments of apparatus and methods in accordance with the present disclosure, as represented in the Figures, is not intended to limit the scope of the disclosure, as claimed, but is merely representative of certain examples of embodiments in accordance with the disclosure. The presently described embodiments will be best understood by reference to the drawings, wherein like parts are designated by like numerals throughout. Moreover, the drawings are not necessarily to scale, and the size and relative sizes of the layers and regions may have been exaggerated for clarity.

As used in the description herein and throughout the claims, the following terms take the meanings explicitly associated herein, unless the context clearly dictates otherwise: the meaning of "a", "an", and "the" includes plural reference, the meaning of "in" includes "in" and "on". It will also be understood that when an element or layer is referred to as being "on" another element or layer, the element or layer may be directly on the other element or layer or intervening elements or layers may be present. As used herein, the term "and/or" may include any and all combinations of one or more of the associated listed items.

According to an exemplary embodiment, a method of generating a structural color is provided. The method may be performed by steps of forming an aligned structure of magnetic nanoparticles in a medium and fixing the aligned structure of magnetic nanoparticles. As a result, the aligned structure allows light to diffract, thereby exhibiting a structural color. To form the aligned structure, an external magnetic field may be applied to the medium to align the magnetic nanoparticles in a chain structure in a direction of a magnetic field line. The aligned structure may be formed in a liquid medium. The liquid medium may be converted into a solid medium, thereby fixing the aligned structure. For example, when the liquid medium includes a photocurable material, the fixation may be performed by applying UV rays to the medium. The medium can be any medium that is phase-changeable from a liquid to a solid phase. As a non-limiting example, the medium may include a UV-curable resin such as a polyethyleneglycol diacrylate (PEGDA) oligomer, an acryl resin, an epoxy resin, a polyester resin, a stereolithography resin or any other resin which can be solidified by UV exposure. The medium may be a photocurable, thermocurable, air-curable or energy-curable liquid medium. The medium may be a transparent or semi-transparent medium. The medium may be a phase-changeable medium, rather than the liquid medium. The phase-changeable medium may be, for example, CARIVERSE resin disclosed in "CARIVERSE Resin: A Thermally Reversible Network Polymer for Electronic Applications," Chang et al., Electronic Component and Technology Conference, 1999, 1999 Proceedings, 49$^{th}$ Volume Issue, 1999 Page(s): 49-55. The phase-changeable medium may be polyethyleneglycol, paraffin, polyethylene-block-polyethyleneglycol, primary alcohol, polyethylene or polyester. The phase-changeable medium may be reversibly changed between a liquid and a solid depending on a thermal condition.

Hereinafter, exemplary embodiments described in the specification will be described in detail with reference to drawings. FIG. 1 is a diagram of a composition for generating a structural color according to an exemplary embodiment. Referring to FIG. 1, a composition for generating a structural color 100 may include a curable material 110 and magnetic nanoparticles 120 dispersed in the curable material 110.

The magnetic nanoparticles 120 may include a cluster 122 of magnetic nanocrystals. The size of the magnetic nanoparticles 120 may be several tens to hundreds of nanometers, and the size of the magnetic nanocrystals may be several to several tens of nanometers. Examples of the magnetic nanocrystals may include a magnetic materials or a magnetic alloys. The magnetic material or magnetic alloy may include at least one selected from the group consisting of Co, $Fe_2O_3$, $Fe_3O_4$, $CoFe_2O_4$, MnO, $MnFe_2O_4$, CoCu, CoPt, FePt, CoSm, NiFe and NiFeCo.

The magnetic nanoparticles 120 may be superparamagnetic nanoparticles including a superparamagnetic material. The superparamagnetic material has magnetism only in the presence of an external magnetic field, unlike a ferromagnetic material in which magnetism can be maintained without a magnetic field. Usually, when the particle size of a ferromagnetic material is several to several hundreds of nanometers, the ferromagnetic material may be phase-changed into a superparamagnetic material. For example, when iron oxide is in the size of approximately 10 nm, it may have superparamagnetism.

In addition, the magnetic nanoparticles 120 may be, as shown in FIG. 1, coated with a shell layer 124 surrounding a core formed in the cluster 122 of magnetic nanocrystals. The shell layer 124 allows the magnetic nanoparticles 120 to be evenly distributed in the curable material 110. Furthermore, to be described later, the shell layer 124 may stimulate solvation repulsion on a surface of each magnetic nanoparticle 120 to offset potent magnetic attraction between the magnetic nanoparticles 120. For example, the shell layer 124 may include silica. When the shell layer 124 is surface-modified with silica, a known sol-gel process may be used.

In addition, the composition 100 for generating a structural color may further include a hydrogen bonding solvent. As the hydrogen bonding solvent, various alkanol solvents such as ethanol, isopropyl alcohol and ethylene glycol may be used. Also, a solvation layer 126 surrounding the magnetic nanoparticle 120 may be formed. For example, as the solvation layer 126 is formed due to an influence of a silanol (Si—OH) functional group on a surface of the shell layer 124 having silica, a repulsion force between the magnetic nanoparticles 120 may be induced. According to one exemplary embodiment, the shell layer 124 and/or the solvation layer 126 may not be present on the magnetic nanoparticles 120. In this case, an electrostatic force on the surface of the magnetic nanoparticles 120 may act as a repulsion force.

As the magnetic nanoparticles 120 are mixed with the curable material 110 and subjected to mechanical stirring or ultrasonic treatment, the composition 100 for generating a structural color may be prepared. The magnetic nanoparticles 120 may be included in the curable material 110 at a volume fraction of, for example, 0.01% to 20%. When the volume fraction of the magnetic nanoparticles 120 is less than 0.01%, reflectivity may be decreased, and when the volume fraction of the magnetic nanoparticles 120 is more than 20%, reflectivity may not be increased any more.

The curable material 110 may serve as a dispersion medium stably dispersing the magnetic nanoparticles 120 forming a photonic crystal. In addition, as the inter-particle distance between the magnetic nanoparticles 120 is fixed by crosslinking of the curable material 110, a certain structural color may be continuously maintained after a magnetic field is eliminated.

The curable material 110 may include a liquid-phase material such as a monomer, an oligomer or a polymer having a crosslinkable site for curing reaction. The curable material 110 may include a liquid-phase hydrophilic polymer capable of forming a hydrogel. A hydrophilic polymer is a polymer suitable for dispersing the magnetic nanoparticles 120 due to its hydrophilic groups. When the hydrophilic polymer is crosslinked by an appropriate energy source, thereby forming a hydrogel having a three-dimensional network structure, the magnetic nanoparticles 120 may be fixed.

Examples of the curable material 110 capable of forming a hydrogel may include a silicon-containing polymer, polyacrylamide, polyethylene oxide, polyethylene glycol diacrylate, polypropylene glycol diacrylate, polyvinylpyrrolidone, polyvinyl alcohol, polyacrylate or a copolymer thereof. For example, since the curable material 110, polyethylene glycol diacrylate (PEGDA), has an acrylate functional group at both terminal ends of polyethylene glycol (PEG), the curable material 110 may be crosslinked into a three-dimensional hydrogel via free radical polymerization. The curable material 110 may further include any type of medium which can be changed into a solid from a liquid.

The curable material 110 may further include an initiator, and the initiator may induce free radical polymerization by an external energy source. The initiator may be an azo-based compound or a peroxide. The curable material 110 may further include a proper crosslinking agent, for example, N,N'-methylenebisacrylamide, methylenebismethacrylamide, ethylene glycol dimethacrylate, etc. The magnetic nanoparticles 120 may be aligned in the curable material 110 to generate structural colors under an external magnetic field.

Figure 2:
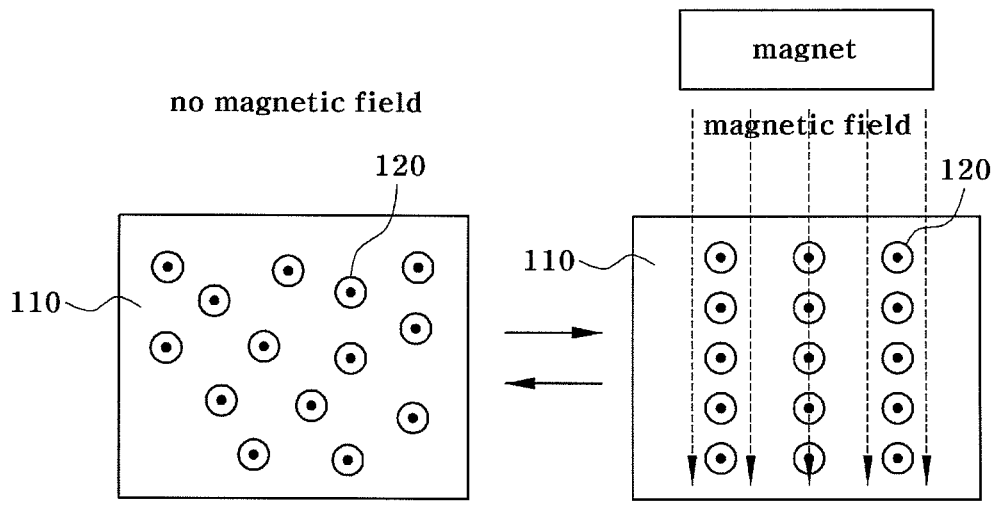
FIG. 2 is a diagram illustrating a principle of generating a structural color.

FIG. 2 is a diagram for explaining a principle of generating a structural color. Referring to FIG. 2, when a magnetic field is not applied, the magnetic nanoparticles 120 are randomly dispersed in the curable material 110, but when a magnetic field is applied from a nearby magnet, the magnetic nanoparticles 120 may be aligned parallel to a direction of the magnetic field to form a photonic crystal, thereby emitting a structural color. The magnetic nanoparticles 120 aligned by the magnetic field may return to the non-aligned state when the magnetic field is eliminated. A photonic crystal is a material having a crystal structure capable of controlling light. Photons (behaving as waves) propagate through this structure—or not—depending on their wavelength. Wavelengths of light that are allowed to travel are known as modes, and groups of allowed modes form bands. Disallowed bands of wavelengths are called photonic band gaps. This gives rise to distinct optical phenomena such as inhibition of spontaneous emission, high-reflecting omni-directional mirrors and low-loss-waveguiding, amongst others. The magnetic nanoparticles 120 present in a colloidal state may have an attractive interaction therebetween in the curable material 110 due to the magnetism when a magnetic field is applied outside, and also have a repulsive interaction caused by an electrostatic force and a solvation force. By the balance between the attraction and the repulsion, the magnetic nanoparticles 120 are aligned at regular intervals, thereby forming a chain structure. Therefore, inter-particle distance d between the aligned magnetic nanoparticles 120 may be determined by the magnetic field strength. As the magnetic field is stronger, the inter-particle distance d between the magnetic nanoparticles 120 aligned along the direction of the magnetic field may be reduced. The inter-particle distance d may be several to several hundreds of nanometers with the magnetic field strength. With a lattice spacing in the photonic crystal is changed, the wavelength of reflected light may be changed according to Bragg's law. As the magnetic field strength is increased, a structural color of a shorter wavelength region may be generated. As a result, a wavelength of the reflected light may be determined by the strength of a specific magnetic field. Unlike the conventional photonic crystal reflected only at a certain wavelength, the photonic crystal may exhibit an optical response that is fast, extensive and reversible with respect to an external magnetic field.

As the lattice spacing is changed with the variation in the nearby magnetic field, the reflective light with a specific wavelength may be induced from external incident light.

The structural color may be dependent on a size of the magnetic nanoparticle 120 as well as the magnetic field strength. For example, as $Fe_3O_4$ magnetic nanoparticle 120 with a silica shell is increased in size from approximately 120 nm to approximately 200 nm, the structural color may shift from blue to red. However, it can be appreciated that the color or the diffraction wavelength is determined by not only the magnetic nanoparticle size, the silica shell layer, and magnetic field strength, but also many other parameters such as the chemical nature of the curable material, the surface charge of the particle surface, and the additives.

Figure 3:
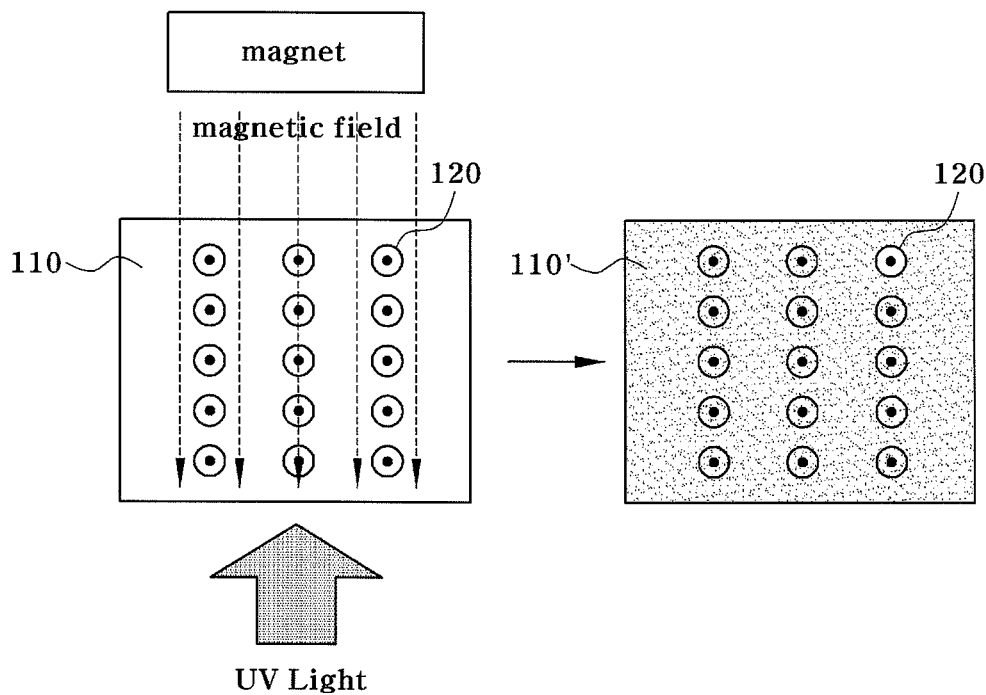
FIG. 3 is a diagram illustrating a step of fixing a photonic crystal structure by curing a composition for generating a structural color.

FIG. 3 is a diagram illustrating a step of fixing a photonic crystal structure by curing a composition for generating a structural color. As shown in FIG. 3, a solid medium 110' is formed by a curing process performed by exposing a composition 100 for generating a structural color including a curable material 110 and magnetic nanoparticles 120 to a magnetic field and irradiating UV rays. As a result, a photonic crystal structure of the magnetic nanoparticles 120 may be fixed in the solid medium 110'. Therefore, by applying the composition 100 for generating a structural color to a certain substrate, a structural color printed layer may be formed on the substrate. The composition 100 for generating a structural color may be simply prepared at a low cost, and exhibit diffracted light with various wavelengths in an entire region of visible light.

Physical/chemical properties of the solid medium 110' may be modulated by changing molecular weight of the curable material 110, a concentration of an initiator, an irradiation time of UV rays, etc.

By the curing of the curable material 110, the solid medium 110' may be in the form of a crosslinked polymer. A spacing between chains of the crosslinked polymer having a network structure may be approximately 1 to several nanometers. Thus, provided that the conventional magnetic nanoparticles 120 can have a size of approximately 150 to 170 nm, the magnetic nanoparticles 120 may be easily fixed. As a solvation layer 126 is coated on a surface of the magnetic nanoparticles 120, the magnetic nanoparticles 120 are spaced apart in a regular distance.

As a result, when the composition 100 for generating a structural color described above is applied to a suitably selected substrate, a structural color printed product exhibiting a structural color by the magnetic nanoparticles 120 containing a superparamagnetic material may be produced. The magnetic nanoparticles 120 included in the structural color printed product are spaced at regular intervals to form chain structures in an orientation of at least one axis. A wavelength of light diffracted from external incident light may be determined by inter-particle distance between the magnetic nanoparticles 120 forming the chain structures, and a structural color may be exhibited.

Figure 4:
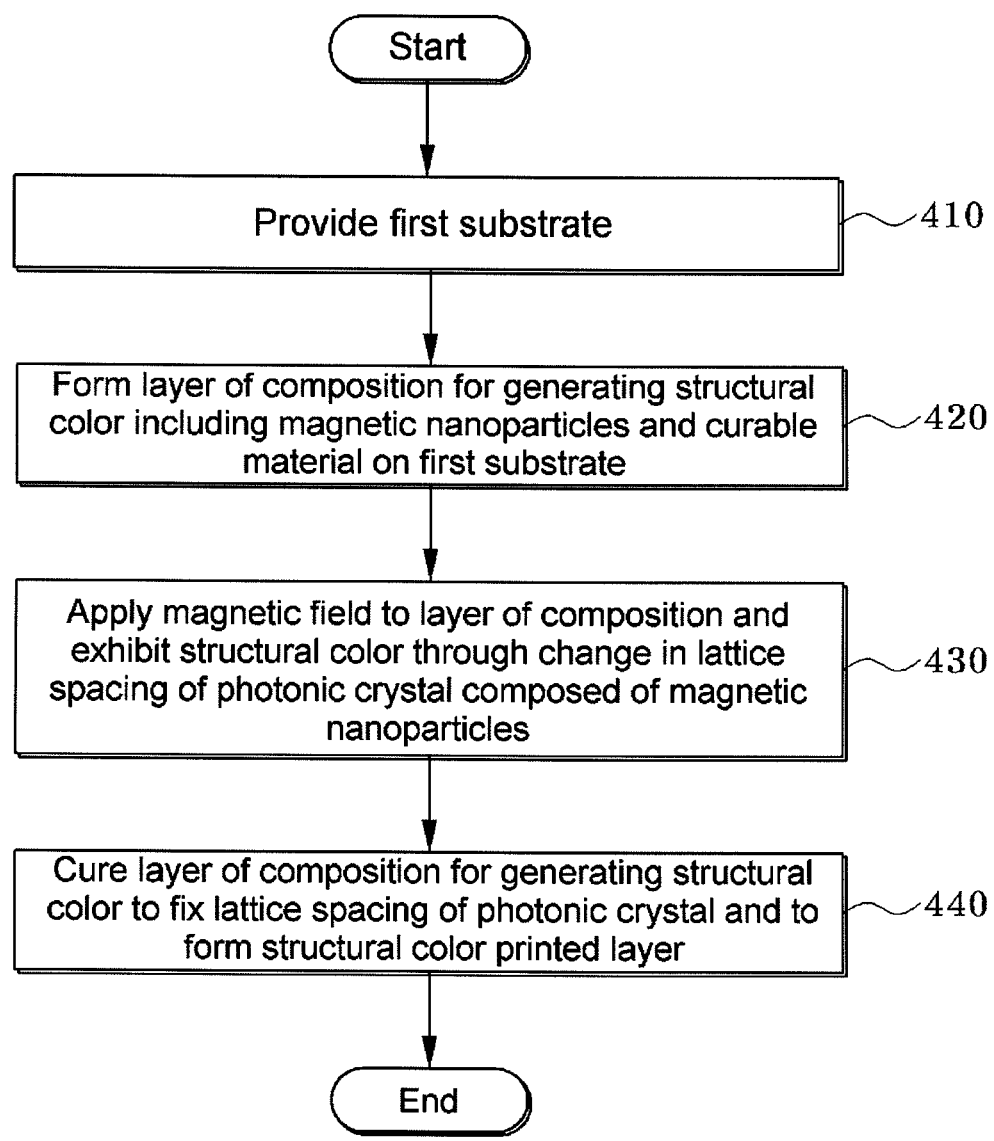
FIG. 4 is a process flowchart of a method of printing a structural color according to an exemplary embodiment.

Hereinafter, a method of printing a structural color by fixing a photonic crystal structure reflecting light with a specific wavelength using a composition for generating a structural color including magnetic nanoparticles will be described. FIG. 4 is a process flowchart illustrating a method of printing a structural color according to an exemplary embodiment. Referring to FIG. 4, in S410, a substrate is provided. In S420, a layer of a composition for generating a structural color including magnetic nanoparticles and a curable material is formed on the first substrate. In S430, a structural color is exhibited through a change in lattice spacing of the photonic crystal composed of the magnetic nanoparticles depending on a magnetic field strength applied to the layer of the composition for generating a structural color. In S440, a structural color printed layer is formed by fixing the lattice spacing of the photonic crystal by curing the layer of the composition for generating a structural color. According to the above method, a structural color may be printed on a substrate.

Figure 5:
FIGS. 5 to 9 are diagrams specifically illustrating a method of printing a structural color according to an exemplary embodiment.

FIGS. 5 to 9 are diagrams specifically illustrating a method of printing a structural color according to an exemplary embodiment. Referring to FIG. 5, first, a first substrate 500 is provided. When light is used as an energy source, the first substrate 500 may be formed of a transparent material, for example, glass. Meanwhile, in some cases, as shown in FIG. 5, a coating layer 510 may be further formed on the first substrate. The coating layer 510 may be formed by coating and curing a curable material on the first substrate. The coating may be performed by various methods such as spray coating, dip coating, etc. As the curable material, a solution including a hydrophilic polymer such as polyethylene glycol may be used, and a hydrogel layer may be formed by curing the solution. An example of the curable material capable of forming the hydrogel layer is the same as that of the curable material 110 described with reference to FIG. 1, and thus detailed description thereof will be omitted.

Figure 6:
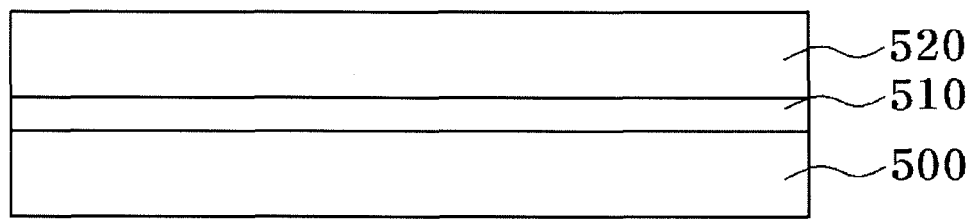

Referring to FIG. 6, a layer 520 of composition for generating a structural color including magnetic nanoparticles and a curable material is formed on a coating layer 510. Here, the coating layer 510 may prevent agglomeration of magnetic nanoparticles and allow the composition for generating a structural color to be evenly spread. According to an exemplary embodiment, the layer 520 of the composition for generating a structural color may be directly coated on the first substrate 500 without stacking the coating layer 510 on the first substrate 500. The layer 520 of the composition for generating a structural color may further include an initiator and/or crosslinking agent for polymerization and a crosslinking reaction. Detailed description of the composition for generating a structural color is the same as that of the composition 100 for generating a structural color with reference to FIG. 1 and thus will be omitted.

Figure 7:
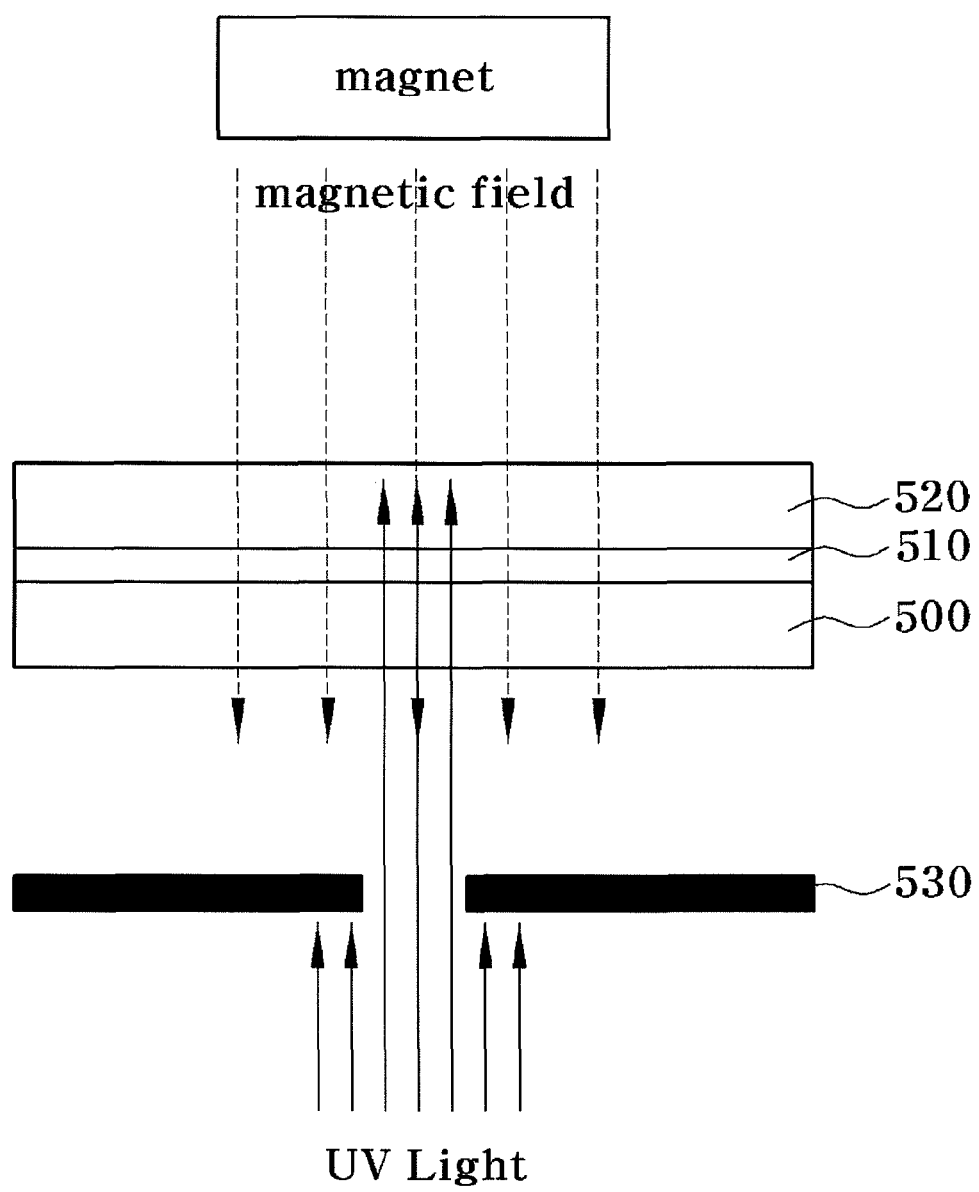

Referring to FIG. 7, a magnetic field is applied to the first substrate 500 on which the layer 520 of the composition for generating a structural color is coated. Light with a specific wavelength may be reflected due to alignment of magnetic nanoparticles depending on the magnetic field strength generated from a magnet. The application of the magnetic field may be performed by a permanent magnet or an electromagnet disposed above the layer of the composition for generating a structural color. Here, the magnetic field strength may be varied by changing a distance between the permanent magnet and the first substrate 500, or modulating current or voltage of electricity flowing through a coil wound around the electromagnet. As described with reference to FIG. 1, when a magnetic field is applied, magnetic nanoparticles may be aligned in one-dimensional chain structures along the direction of the magnetic field with the proper balance of attractive and repulsive forces. As the magnetic field strength increases, the inter-particle distance between the magnetic nanoparticles aligned in the layer 520 of the composition for generating a structural color is decreased and a structural color with a shorter wavelength may be exhibited. It can be appreciated that as the magnetic field strength is modulated, structural colors with various wavelengths may be exhibited depending on the change in lattice spacing of a photonic crystal of the magnetic nanoparticles.

As shown in FIG. 7, the intensity of the magnetic field is maintained, and a part of the layer 520 of the composition for generating a structural color is simultaneously cured. For curing, patterned UV rays are irradiated using a mask 530. A photonic crystal with chain structures may be fixed within several seconds by the application of the UV rays. To facilitate the application of the UV rays, the first substrate 500 may be formed of a material through which UV rays are penetrated. An energy source used for curing may be heat, visible light, infrared rays and electron beams, in addition to the UV rays. The mask 530 used for patterning may be, for example, a static mask or dynamic mask. As an example of the dynamic mask, a digital micromirror device (DMD) may be used. Therefore, when radical polymerization is caused by thermal or light energy penetrated through the mask 530 and thus a part of the layer 520 of the composition for generating a structural color is cured, the cured part of the layer 520 may continuously exhibit a uniform structural color even when the magnetic field is removed. A patterned region with a specific structural color may be produced by the irradiation of the patterned UV rays.

Figure 8:
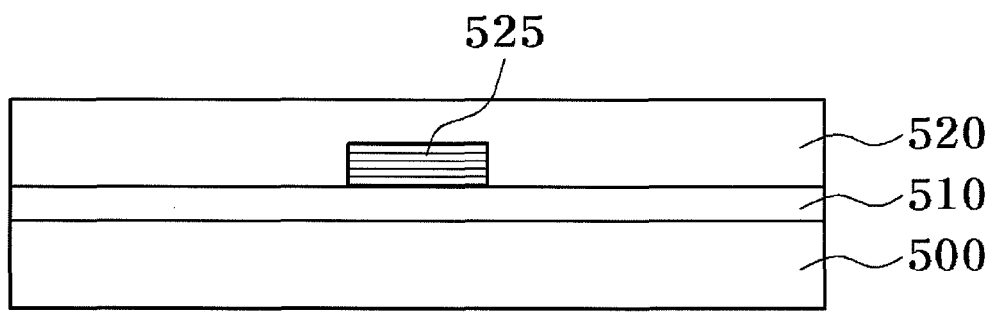

Referring to FIG. 8, a structural color printed layer 525 is formed by curing a part of the layer 520 of the composition for generating a structural color in the presence of the magnetic field. For example, full color may be expressed by combining patterned regions capable of exhibiting red (R), green (G) and blue (B) structural colors, respectively. A size of each patterned region may have a scale of several to several hundreds of micrometers.

Figure 9:
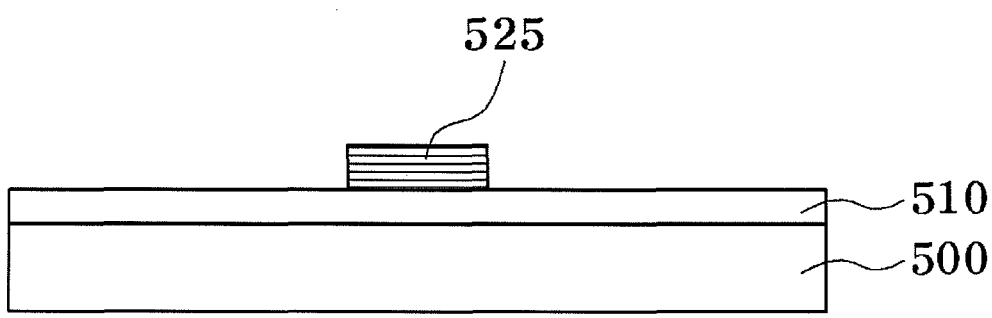

Referring to FIG. 9, remaining uncured parts of the layer 520 are removed. To remove the uncured parts of the layer 520 of the composition for generating a structural color, a solvent such as ethanol may be used. Through steps of solvent removal and drying, a structural color printed product in which a printed layer 525 is formed on the first substrate 500 may be obtained.

Figure 10:
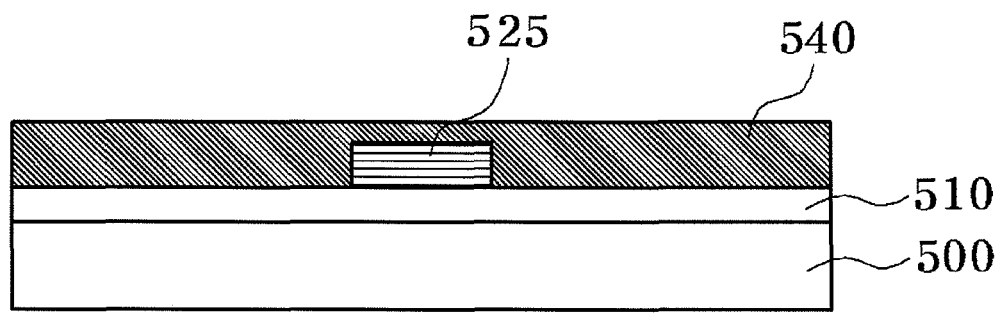
FIGS. 10 to 12 are diagrams illustrating a step of transferring a structural color printed layer to a second substrate according to an exemplary embodiment.
Figure 11:
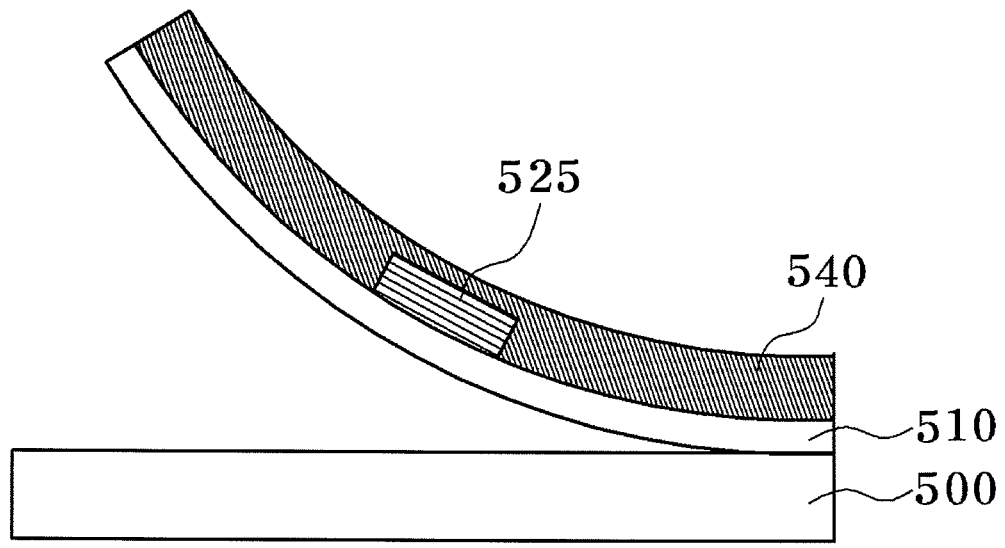
Figure 12:
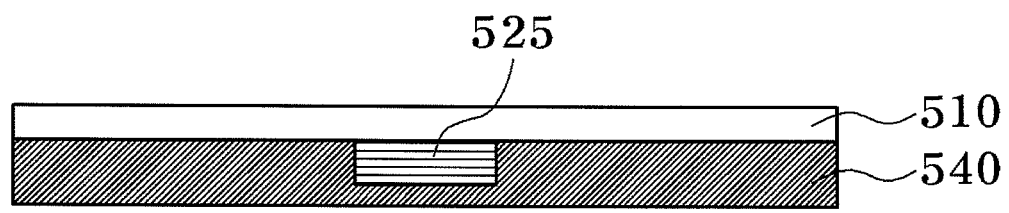

According to another exemplary embodiment of the method of printing a structural color, the structural color printed layer 525 may be transferred to another substrate. FIGS. 10 to 12 are diagrams illustrating a step of transferring a structural color printed layer to a second substrate according to an exemplary embodiment. Referring to FIG. 10, first, a second substrate 540 having an adhesive layer (not shown) coated on one side thereof is joined to a first substrate 500. The second substrate 540 may be directly joined to the first substrate 500 by the adhesive layer, or may be joined to a coating layer 510 when the coating layer 510 is present as shown in the drawing. The second substrate 540 may be an opaque film. The second substrate 540 may be a film that blocks penetrated light and prevents unnecessary back-scattering so as to exhibit a clear structural color. For example, the second substrate 540 may be a black polymer film. The adhesive layer may include an acryl- or epoxy-based adhesive.

Referring to FIGS. 11 and 12, a structural color printed layer 525 is transferred to the second substrate 540 by releasing the second substrate 540 from the first substrate 500. Due to the presence of the above-mentioned adhesive layer, an adhesive strength between the second substrate 540 and the coating layer 510 may be stronger than that between the coating layer 510 and the second substrate 540. Therefore, when the coating layer 510 is present on the first substrate 500 in addition to the structural color printed layer 525, the coating layer 510 may also be transferred to the second substrate 540 together with the structural color printed layer 525. As a result of transferring, the structural color printed layer 525 may be present on the second substrate 540. Since the coating layer 510 is transparent, the underlying structural color printed layer 525 may be observed, and coating layer 510 may serve to protect the structural color printed layer 525 from an external environment.

According to an exemplary embodiment, a method of generating a structural color includes performing multi-color patterning of a structural color. To generate a structural color, magnetic nanoparticles including a superparamagnetic material are aligned in a photocurable material, thereby tuning an aligned structure. Next, the aligned structure is fixed by curing the photocurable material. Here, the structural color may be multi-color patterned by repeating the tuning and the fixation. In addition, to control the aligned structure, a hydrogen-bonding solvent may be added to the photocurable material, thereby further forming solvation layers around the magnetic nanoparticles. The aligned structure may be formed by assembling the magnetic nanoparticles in chain structures along the magnetic field lines by an external magnetic field. The determined structural color may be dependent on the inter-particle distance between the magnetic nanoparticles. The tuning may be performed by changing the inter-particle distance between the magnetic nanoparticles using the external magnetic field. For example, as the external magnetic field strength is increased, a spacing between the magnetic nanoparticles forming the chain structure may be decreased. The fixation may be performed using UV rays having a wavelength of 240 to 365 nm.

Figure 13:
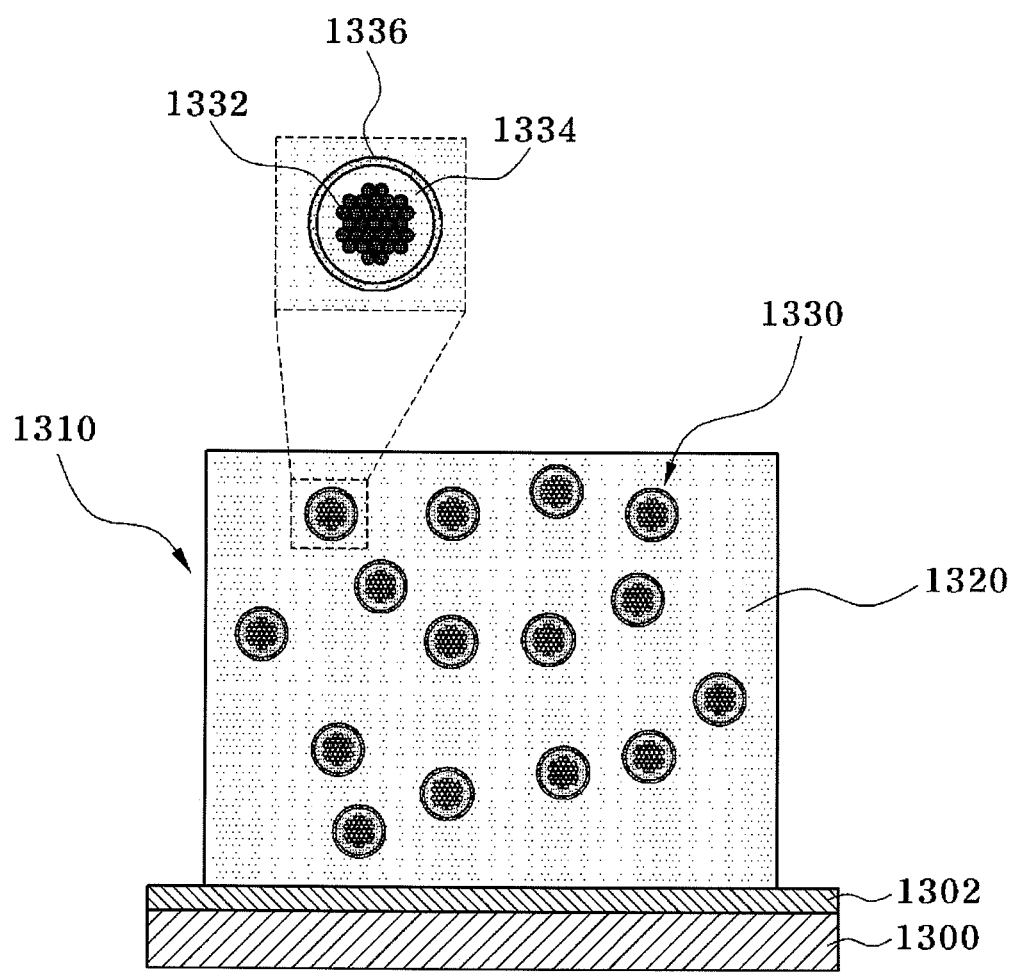
FIGS. 13 to 18 are diagrams illustrating a process of multicolor patterning a structural color with a single material by sequential steps of "tuning and fixing"
Figure 14:
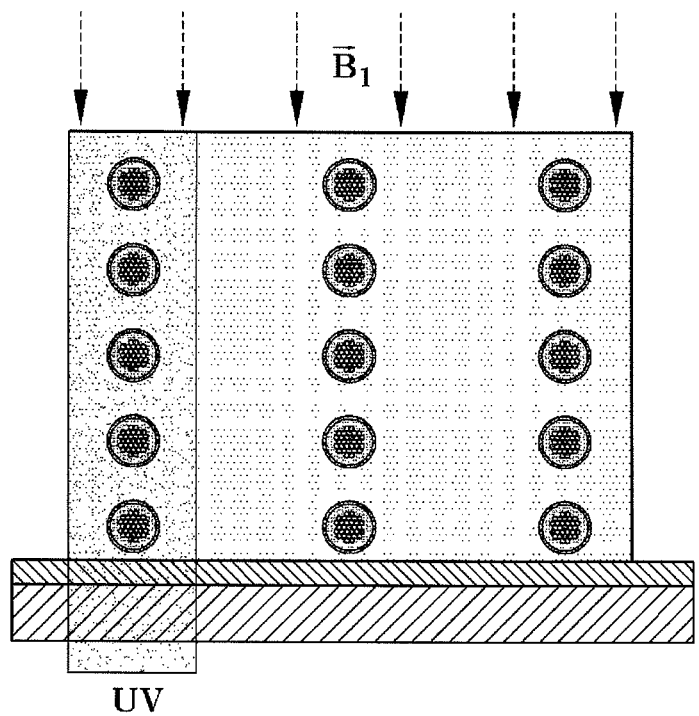
Figure 15:
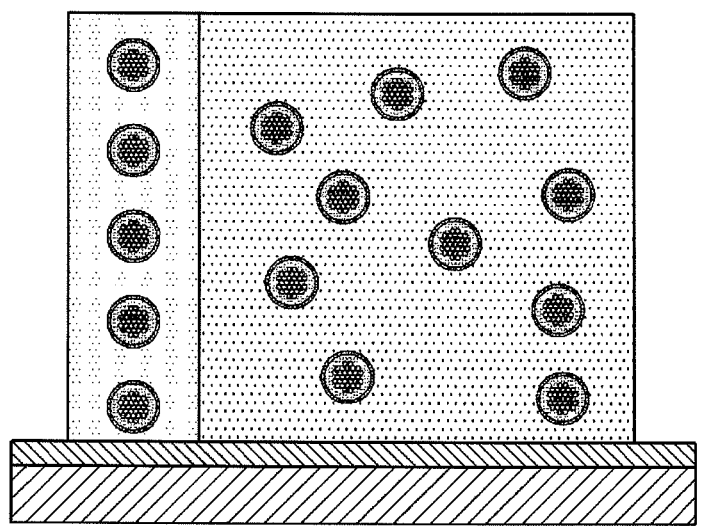
Figure 16:
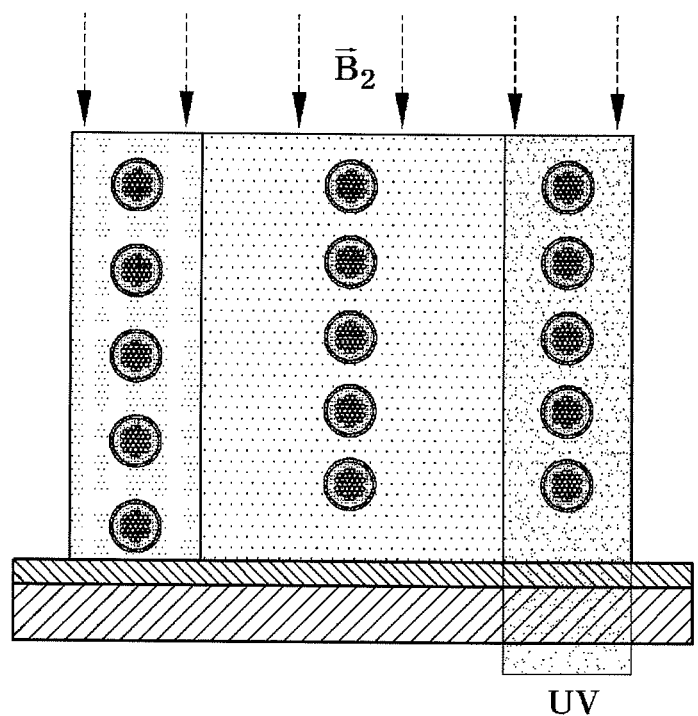
Figure 17:
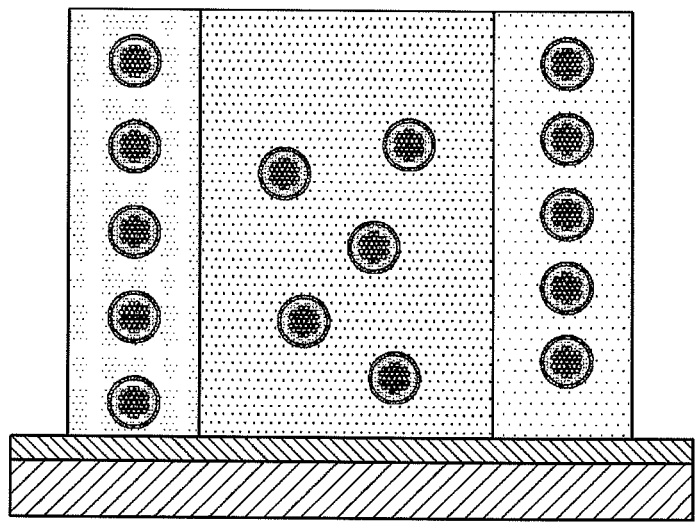
Figure 18:
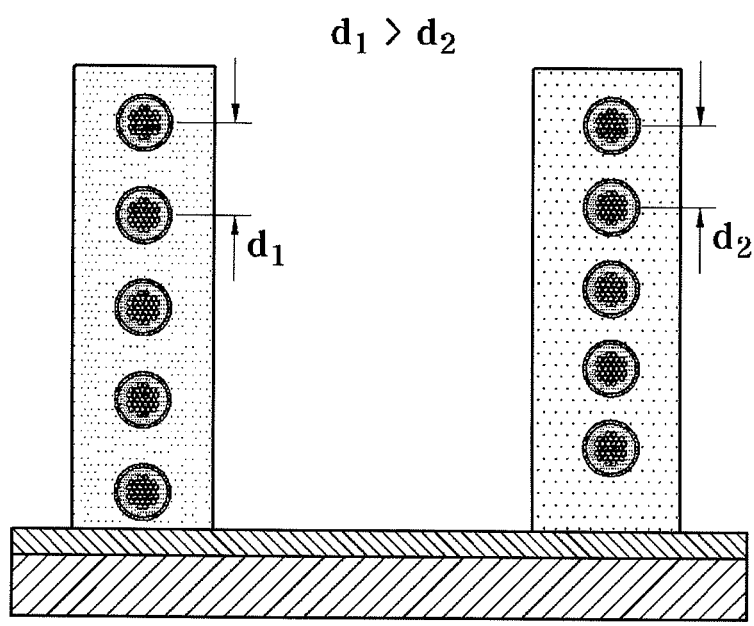

FIGS. 13 to 18 illustrate a process of multi-color patterning a structural color using a single material by sequential steps of "tuning and fixing" according to an exemplary embodiment. In FIG. 13, a composition 1310 for generating a structural color is coated on a glass slide substrate 1300 on which polyethylene glycol 1302 is coated. The composition 1310 for generating a structural color includes a curable material 1320 and superparamagnetic nanoparticles 1330 dispersed in the curable material 1320. The superparamagnetic nanoparticles 1330 have clusters 1332 of $Fe_3O_4$ nanocrystals as a core, the core is surrounded by a silicon shell layer 1334, and the outermost surface is surrounded by an ethanol solvation layer 1336. In FIG. 14, a magnetic field $B_1$ is applied to the composition 1310 for generating a structural color to tune a color for the composition 1310 for generating a structural color to exhibit a red color. Simultaneously, patterned UV rays are applied to a partial region in the composition 1310 to cure the curable material 1320, thereby fixing the color. In FIG. 15, when the magnetic field is removed, the cured partial region maintains a red structural color due to chain-shaped periodic arrangement of the superparamagnetic nanoparticles 1330. Meanwhile, in an uncured region, the superparamagnetic nanoparticles 1330 lose the periodic arrangement, and thus the red structural color is disappeared. In FIG. 16, color tuning is performed for the composition 1310 for generating a structural color to exhibit a green color by applying a magnetic field $B_2$ which is stronger than the previous magnetic field $B_1$ to the composition 1310 for generating a structural color. Simultaneously, the color is fixed by curing another partial region of the curable material 1320 using UV rays. In FIG. 17, when the magnetic field is removed, the other cured partial region maintains a green structural color due to the chain-shaped periodic arrangement of the superparamagnetic particles 1330. Meanwhile, in an uncured region, the superparamagnetic nanoparticles 1330 lose the periodic arrangement, and thus the green structural color is disappeared. In FIG. 18, the remaining uncured composition 1310 for generating a structural color is washed away, thereby obtaining a printed product patterned with red and green colors. In FIG. 18, $d_1$ and $d_2$ are respectively distances between the superparamagnetic nanoparticles 1330 in the red and green regions. A multi-color patterned printed product may be obtained by repeating the above-mentioned "tuning and fixing" steps.

For the patterning process, for example, a DMD may be used. In this case, when the composition for generating a structural color is precipitated once during the process, a multiple UV exposure pattern may be dynamically controlled without changing physical masks. Since there is no need to align a substrate or mask, high-definition multiple patterns may be produced.

Figure 19:
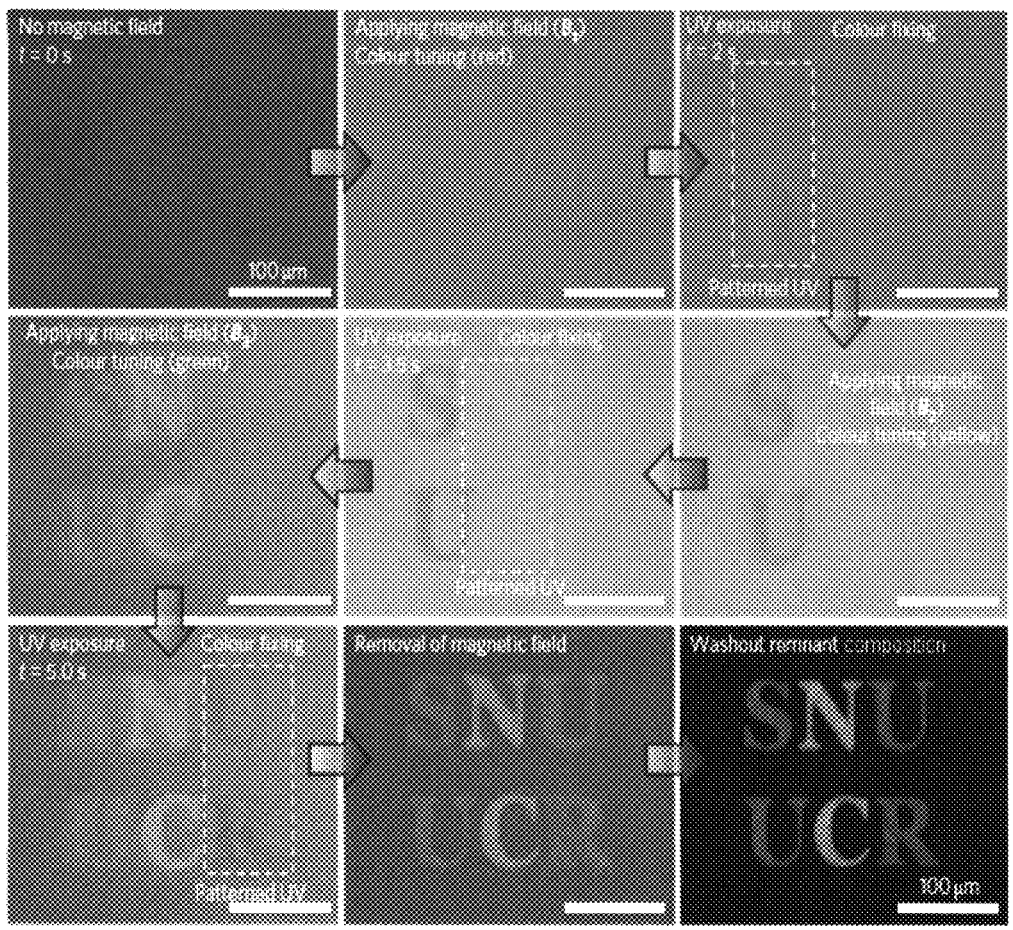
FIG. 19 illustrates actual images illustrating patterning in multiple structural colors using a composition for generating a structural color.

FIG. 19 illustrates actual images illustrating patterning in multiple structural colors using a composition for generating a structural color. Referring to FIG. 19, a procedure of forming a multi-color pattern such as "SNU/UCR" within several seconds by sequential color tuning and fixing processes is illustrated.

According to the above-mentioned method of generating a structural color, high-resolution patterning of multiple structural colors may be achieved using just a single material. A printed layer having a desired shape and continuously expressing a structural color may be formed on a substrate by fixing a photonic crystal structure composed of magnetic nanoparticles for a short time by curing a curable material.

Figure 20:
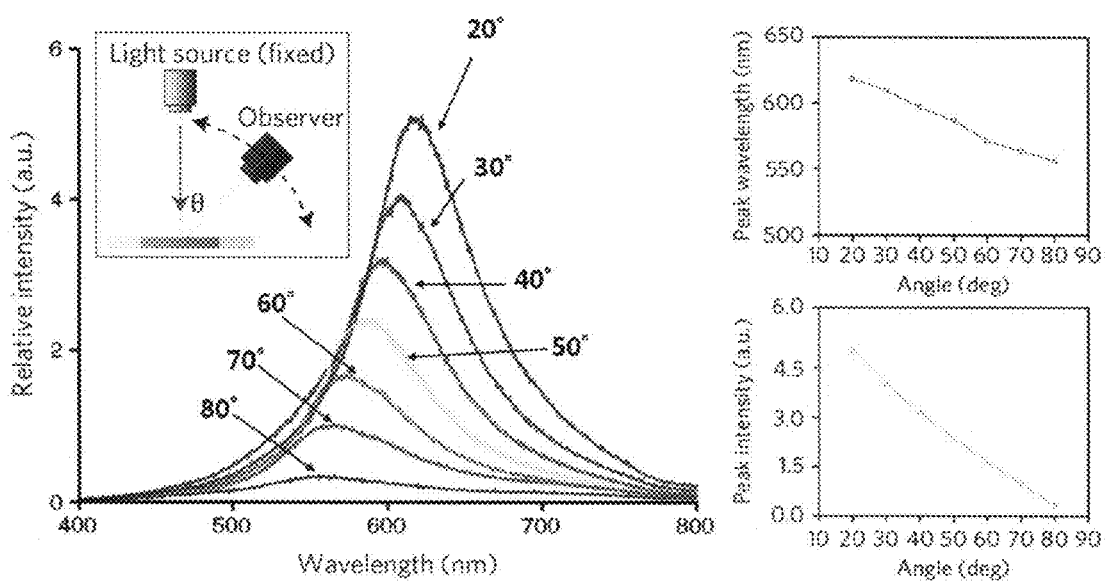
FIG. 20 illustrates the optical characteristics of spectra variation in relation to viewing angle.
Figure 21:
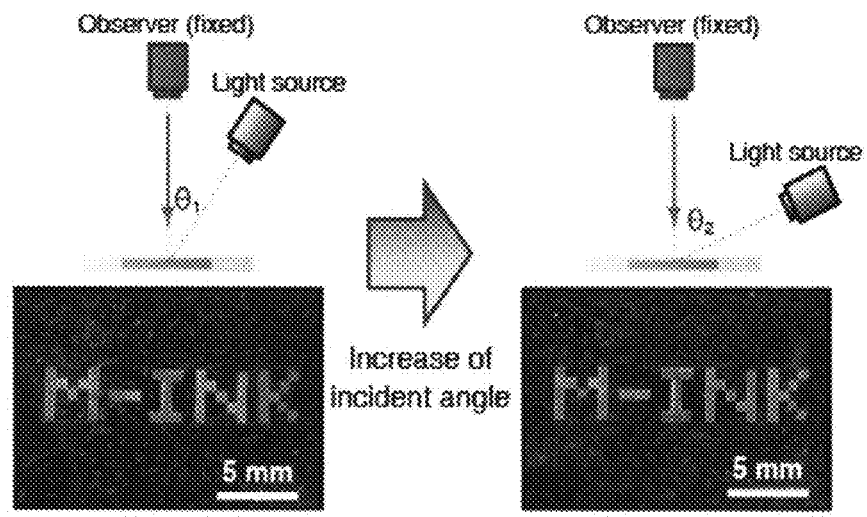
FIG. 21 illustrates images illustrating a phenomenon in which an angle of white light incident to a structural color film is changed and thus a color is differently shown.

A structure of the superparamagnetic nanoparticles aligned along the direction of a magnetic field lines may exhibit different colors depending on viewing angle due to differences in optical paths. FIG. 20 illustrates the optical characteristics of spectra variation in relation to viewing angle. An angle between incident light and axis of chain may determine color seen by observer. A peak wavelength of the observed spectrum moves to a short wavelength with increase of viewing angle. FIG. 21 illustrates images illustrating a phenomenon in which an angle of white light incident to a structural color film is changed, and thus a color is differently shown. When the angle of incident white light is changed and observed in a vertical direction with respect to the structural color film, a color of the structural color film is changed with the angle. Owing to its unique optical property, the structural color film can be used as a forgery protection film on currency and various structurally colored design materials.

The foregoing is illustrative of the present disclosure and is not to be construed as limiting thereof. Although numerous embodiments of the present disclosure have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A method of printing a structural color comprising:
   providing a first substrate;
   forming a layer of a composition for generating a structural color including magnetic nanoparticles and a curable material on the first substrate,
   applying a magnetic field to the layer of the composition for generating a structural color and exhibiting a structural color through a change in lattice spacing of a photonic crystal composed of magnetic nanoparticles depending on the magnetic field strength; and
   curing the layer of the composition for generating a structural color to fix the lattice spacing of the photonic crystal and to form a structural color printed layer.

2. The method according to claim 1, wherein the magnetic nanoparticles include a superparamagnetic material.

3. The method according to claim 1, further comprising a solvation layer surrounding a surface of the magnetic nanoparticles.

4. The method according to claim 1, wherein the curable material includes a monomer, an oligomer or a polymer having a crosslinkable site.

5. The method according to claim 1, wherein the application of the magnetic field is performed by a permanent magnet or an electromagnet disposed above the layer of the composition for generating a structural color.

6. The method according to claim 1, wherein the curing is performed by photocuring.

7. The method according to claim 1, further comprising:
   joining a second substrate having an adhesive layer coated on one side thereof to the structural color printed layer; and
   releasing the second substrate from the first substrate, thereby transferring the structural color printed layer to the second substrate.

8. The method according to claim 1, further comprising a coating layer formed on the first substrate.

9. The method according to claim 8, wherein the coating layer is transferred to the second substrate together with the structural color printed layer.

10. A method of generating a structural color comprising fixing an aligned structure of magnetic nanoparticles in a medium to diffract light due to the aligned structure and to generate the structural color,
    wherein the aligned structure is produced in a liquid medium, the liquid medium is converted into a solid medium, and thus the aligned structure is fixed.

11. The method according to claim 10, wherein the aligned structure is produced by an external magnetic field.

12. The method according to claim 10, wherein the liquid medium includes a photocurable material.

13. The method according to claim 12, wherein the fixation is performed by applying UV rays to the medium.

14. The method according to claim 10, wherein the aligned structure is produced in a phase-changeable medium reversibly changed between a liquid and a solid.

15. A method of producing a structural color comprising:
    tuning an aligned structure by aligning magnetic nanoparticles containing a superparamagnetic material in a photocurable material; and
    fixing the aligned structure by curing the photocurable material,
    wherein the tuning and the fixing are repeated to perform multi-color patterning.

16. The method according to claim 15, wherein the aligned structure is formed by assembling the magnetic nanoparticles in chain structures along the magnetic field lines by an external magnetic field.

17. The method according to claim 15, wherein the structural color is determined by inter-particle distance between the magnetic nanoparticles.

18. The method according to claim 15, wherein the tuning is performed by changing inter-particle distance between the magnetic nanoparticles using an external magnetic field.

19. The method according to claim 15, wherein the fixing is performed by UV rays having a wavelength of 240 to 365 nm.

20. The method according to claim 15, further comprising adding a hydrogen-bonding solvent to the photocurable material and forming a solvation layer around the magnetic nanoparticle.

* * * * *